3,378,083
HUB RESTRAINT
Robert L. Lichten, Dallas, and Kenneth G. Wernicke, Hurst, Tex., assignors to Bell Aerospace Corporation, Wheatfield, N.Y.
Filed June 1, 1967, Ser. No. 642,938
3 Claims. (Cl. 170—160.27)

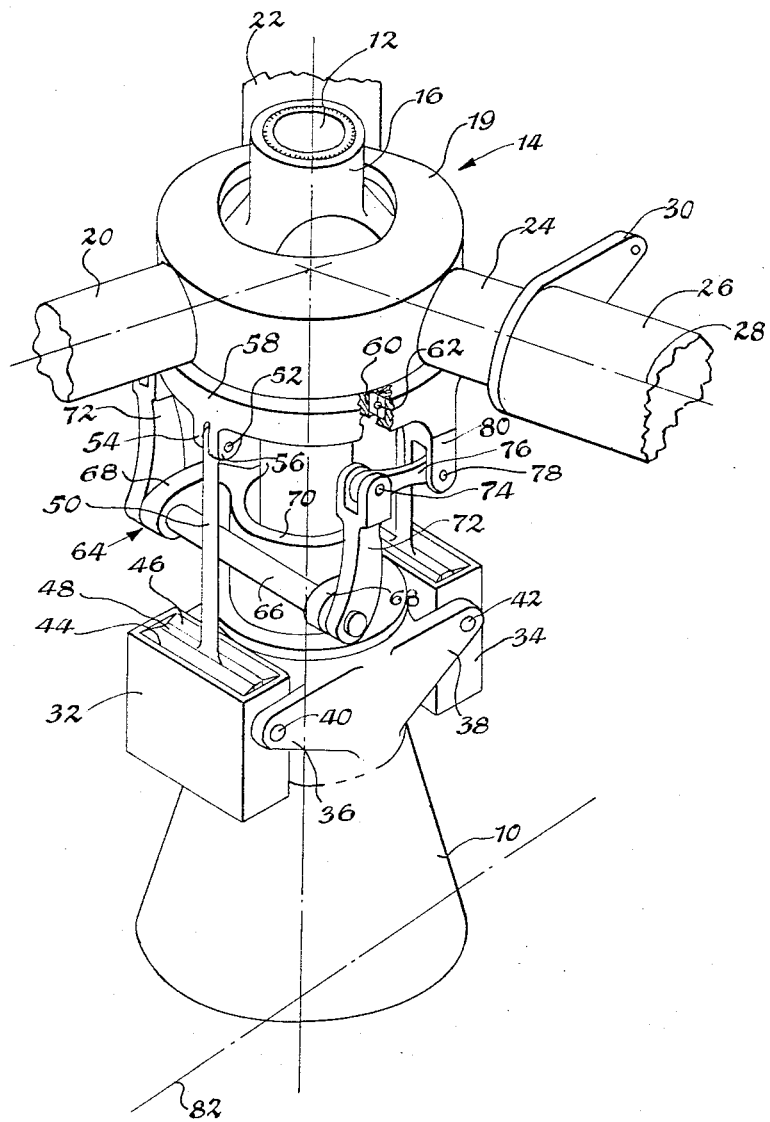

ABSTRACT OF THE DISCLOSURE

Restraining means for the hub of a rotary wing system attached in stationary position with respect to the rotating hub for steady-state restraining action in response to cyclic flapping of the rotor system.

Background of the Invention

The advantages of employing elastic restraint of blade flapping in a helicopter rotor system are well known. In general, these advantages are augmentation of the control power provided by normal thrust vector tilt, reduction of flapping and increased stability.

Prior art arrangements for elastic restraint of blade flapping involve elastic restraint directly associated with and forming part of the rotating components of the rotor system, as exemplified for example by the United States Patent No. 2,949,965, to John A. De Tore et al. and the United States Patent No. 2,961,051, to E. Burke Wilford et al. Because the elastic restraint mechanism is part of the rotating components in these prior art arrangements, an oscillating deflection of the restraint mechanism occurs in response to cyclic flapping of the blades. This imposes a heavy burden upon the restrainti mechanism as well as upon the rotor system which, in turn, results in the requirement of substantial mass for these components. More importantly, the parts are subjected to fatigue stresses, thus decreasing their usable life and safety.

According to the present invention, the restraint mechanism is non-rotating and is not part of the rotating components. As a result, cyclic flapping of the blades, corresponding to any given control input, imposes a fixed or steady deflection upon the restraint mechanism in contrast to the oscillatory deflection which occurs when the restraint mechanism is part of the rotating system as in the prior art. As a result, the non-rotating restraint mechanism may be made appreciably lighter since oscillatory stress reversal does not occur; it does not impart one per revolution vibration or stress reversal on the rotor system and hence inordinate increase in weight here is not required, and in addition, it allows freedom in the manner in which the restraint is applied. As to this last advantage, the stationary restraint mechanism of this invention allows restraint to be used only in the fore and aft direction, only in the lateral direction, in both directions or others, and it also allows different degrees of restraint to be used in different directions, say fore and aft as opposed to laterally.

In the drawing:

The figure is a perspective view of the hub restraint mechanism in accord with the present invention and related portions of the rotor system.

With reference now to the drawing, the reference numeral 10 indicates pylon or support mechanism of conventional construction as used for example in a helicopter whereas the reference character 12 indicates the rotor drive shaft. The rotor hub is indicated generally by reference character 14 and the hub is fixed for rotation with the drive shaft 12 through the medium of a spider 16 which, in turn, universally mounts the annular hub body 18 so as to allow flapping motions of the hub assembly relative to the drive shaft 12, all as is conventional and well known in the art. In the particular form of the invention shown in the drawing, the rotor hub body 18 is provided with a plurality of stub shafts 20, 22 and 24 which rotatably mount blade grip members such as that indicated by the reference character 26 for rotation with respect to the respective stub axles about pitch change axes such as the one indicated by the reference character 28. The blade grip members 26 attach rotor blades to the hub assembly for pitch change motion and this motion is imparted to the blades through the usual cyclic and collective pitch control mechanisms (not shown) through the medium of pitch control horns such as that indicated by the reference character 30.

The above construction is all conventional in the art and may, for the purposes of this invention, be substituted by any equivalent mechanism to provide what is commonly termed a semi-rigid rotor system. There are certain advantages to be obtained by the utilization of elastic restraint to flapping motion of the blades in such a rotor system and these advantages are well enumerated in the prior art as for example the aforementioned Patent 2,949,965. In the prior art arrangements, however, the elastic restraint mechanism forms a part of the rotating mass of the system. In contrast to this, according to the present invention, as can be seen from the drawing, the elastic restraint mechanism does not rotate with the drive shaft 12 and, as a matter of fact, is mounted directly upon the support mechanism or pylon 10. In the particular type of elastic restraint mechanism shown, there are provided a pair of housing members 32 and 34 diametrically disposed with respect to each other and each mounted between ears 36 and 38 integral with the pylon 10 and pivotally carried between such ears by means of the pintles 40 and 42, the purpose of which will be presently apparent. Bonded to the inner faces of each of these housings 32 and 34 are rubber blocks 44 and 46 or other suitable elastic material and the blocks in turn sandwich between them and are bonded to a plate or blade member 48. The blade member is joined to the stem 50 which projects upwardly and is pivotally connected, as by a pin 52, between the ears 54 and 56 of an outer race member 58. The outer race member 58 is journalled upon the rotor hub 18 as by means of the inner race 60 and intervening bearing balls 62. In addition, the outer race member 58 is fixed against rotation by means of the linkage system indicated generally by the reference character 64.

The system 64 includes the cross shaft 66 journalled in the bracket ears 68 fixed to a collar 70 which may be integral with or otherwise fixed to the pylon 10. The cross shaft 68 carries upwardly extending arms 72 having bifurcated upper ends pivotally joined, as at 74, to the links 76. The links, in turn are pivotally joined, as at 78, to depending bifurcations 80 fixed to the outer race member 58.

In operation, it will be seen that cyclic flapping of the blades will be resisted by the elastic restraint members 32, 34 occasioned by tilting of the rotor hub. Such tilting of the rotor hub will be resisted in shear by the elastic blocks 44, 46 and, in the particular case shown, only in the fore-and-aft direction indicated by the broken line 82. If restraint is desired in the lateral or any other direction, additional restraint members may be used in alignment with such other direction or directions. It will be appreciated that these additional restraint members need not display the same restraint characteristics as any others so that the degree of restraint in any given direction may be selected to suit optimum conditions The pintles 40, 42 and pivotal connections 52 allow the restraint to accommodate to the tilting of the rotor hub without imposing bending moments upon the blades 48 or stems 50.

We claim:
1. In a rotor system of the type including a non-rotating support mechanism, a rotatable drive shaft, a rotor hub flappingly pivoted to said drive shaft about orthogonally related axes and for rotation therewith whereby said rotor hub is free to tilt about such axes incidental to cyclic flapping thereof, a plurality of rotor blades carried by said rotor hub and adapted for pitch change motions relative thereto, and pitch control mechanism for pilot controlled pitch change of said blades, the improvement comprising, a member rotatably carried by said rotor hub,
elastic means carried by said non-rotating support for resisting tilting of said rotor hub about one of said axes incidental to cyclic flapping motions of said blades, and mechanism directly connected between said member and the elastic means and independent of the pitch control mechanism for continuously exerting a restoring force on said rotor hub incidental to and in proportion to the degree of tilting of said rotor hub about said one axis.

2. In a rotor system, in combination,
a rotor pylon,
a rotatable drive shaft projecting upwardly from said pylon,
a rotor hub,
means universally attaching said rotor hub to said drive shaft, whereby said rotor hub is free to tilt about orthogonally related axes with respect to said drive shaft,
a plurality of rotor blades mounted on said rotor hub for pitch change motions relative thereto,
pitch control mechanism for pilot controlled pitch change of said blades,
a bearing ring rotatably carried by said rotor hub,
and means directly connecting said bearing ring to said pylon independent of the pitch change mechanism normally to position said rotor hub in a fixed position about one of said orthogonally related axes, said means including resilient mechanism for exerting a continuous restoring force on said rotor hub proportional to angular tilting thereof about said one axis.

3. In a rotor system according to claim 2 wherein said resilient mechanism comprises a housing carried by said pylon, a pair of blocks of elastic material bonded to said housing, a blade member sandwiched between and bonded to said blocks, and a stem connecting said blade member to said bearing ring.

References Cited
UNITED STATES PATENTS

| | | | |
|---|---|---|---|
| 2,677,429 | 5/1954 | Laufer | 170—160.55 X |
| 3,045,484 | 7/1962 | Dumez | 170—160.25 X |
| 3,288,227 | 11/1966 | Derschmidt | 170—160.26 |

EVERETTE A. POWELL, JR., *Primary Examiner.*